INVENTORS A. J. DORE
J. A. HERNDON
N. WASSERMAN
BY Charles E. Graves
ATTORNEY

ASSEMBLY FOR MOUNTING AND ALIGNING MODULES

Filed April 21, 1967

United States Patent Office 3,447,036
Patented May 27, 1969

3,447,036

ASSEMBLY FOR MOUNTING AND ALIGNING MODULES

Arthur J. Dore, Naperville, and John A. Herndon, Wheaton, Ill., and Norman Wasserman, Columbus, Ohio, assignors to Bell Telephone Laboratories, Incorporated, Murray Hill and Berkeley Heights, N.J., a corporation of New York Filed Apr. 21, 1967, Ser. No. 632,585
Int. Cl. H02b *1/04, 9/00, 1/10*
U.S. Cl. 317—99 4 Claims

ABSTRACT OF THE DISCLOSURE

Several component trays with end connectors are received on parallel guides in a mounting frame. A faceplate mounted at one end of the frame achieves vertical, horizontal and depth alignment of each tray, thus positioning the end connectors very accurately. Adjustable male coding plugs on the faceplate and similarly adjusted male coding plugs on a mating female connector guard against wrong connections. Coding plugs on the faceplate prevent the plug connection of all female coded connectors with forbidden coding combinations.

*Background of the invention*

This invention relates to modular mounting of electrical components in a frame or the like; and more particularly concerns a mounting structure that insures accurate alignment of the male connector terminals.

In the art of packaging in one place large numbers of separate electrical circuits, it is conventional equipment design practice to mount the circuits on boards in trays and to support the trays in a mounting frame. Advantages in assembly, installation and repair time are thus gained.

A circuit requirement occasionally arises in which a class of components on one major equipment unit must be connected via conductors of the same length to components on a second major equipment unit. In addition, these components on the second major equipment unit may have a similar tight lead length requirement to components on a succeeding major equipment unit. This sequence may continue for a large number of major equipment units.

It may, in addition, be desirable that a defective component be readily replaceable to keep circuit interruption time to a minimum. Furthermore, it may also be desirable that additional major equipment units of these types be added with minimum circuit interruption.

If, in addition, a requirement is imposed that the connector array associated with the components be placed and maintained in a highly precise vertical, horizontal and depth alignment, and further that no chance of error exists in effecting a connection to this array, then no single component mounting and connector arrangement of the prior art is suitable for the purpose.

Accordigly, the primary object of the invention is to package a large number of electrical components in a connector housing, each component or component group being connected to extending male terminals, the package being arranged so that on assembly all such male terminals automatically assume a predetermined spacing with respect to each other required for mating with one or more female plugs.

A related object of the invention is to facilitate the accurate assembly of such a configuration.

An added object of the invention is to make possible the removal of any one component or component group and the ready replacement thereof without altering the original connector alignment.

A still further object of the invention is to mechanically code the entire terminal array, or each half of it, individually for engagement with one and only one female connector plug.

An added object of the invention is to permit assembling fewer components than the maximum capacity of the connector housing without requiring a corresponding change in the mating female plug.

*Summary of the invention*

These and other objects are achieved in accordance with the invention, broadly, by a mounting assembly comprising a mounting frame with parallel guides to receive a large plurality of component trays, and a faceplate mounted at one end of the frame which receives and aligns each tray with respect to vertical, horizontal and depth reference surfaces.

Pursuant to one aspect of the invention, the faceplate comprises a set of spaced vertical alignment slots on either side. These slots accommodate side ridges occurring on each tray. Correct vertical alignment of each tray and its contacts thus is assured. Further, a vertical bar in the faceplate mates with a center slot in each tray. Proper horizontal alignment of each tray and its contacts thus is achieved. Side shoulders on each tray lodge against an edge of the faceplate to establish correct contact extension beyond the frame. The assembly of the trays into the mounting frame is very swift and the desired alignment of the end terminals easily achieved.

Pursuant to another facet of the invention, the faceplate includes a multiplicity of male coding plugs generally extending with the protruding terminals. Each plug may be fixed in one of several positions. During assembly, these coding plugs are arranged in a unique configuration. Similarly, the female connector which mounts onto the entire array of terminals extending from the faceplate, or alternatively onto one-half of this array, also contains a set of coding plugs. The latter coding plugs are preadjusted to mate with only one of the sets of male coding plugs. An array of four male-female coding plug combinations each adjustable in any one of four positions, for example, will when adjusted for mating represent one of two hundred fifty-six possible alignment configurations. Thus, if fewer than 256 such male-female connections are employed in the immediate vicinity, each may have its own unique coding; and it is not possible to effect an incorrect connection.

One feature of the invention, accordingly, resides in a faceplate mounted at the end of a tray-containing frame, the faceplate having vertical, horizontal and depth alignment reference surfaces which accommodate similar reference surfaces on each tray thereby to insure tray alignment.

Another feature of the invention concerns a highly adjustable coding scheme which prevents incorrect connections to the component trays.

*Detailed description of an illustrative embodiment*

Figure 1:
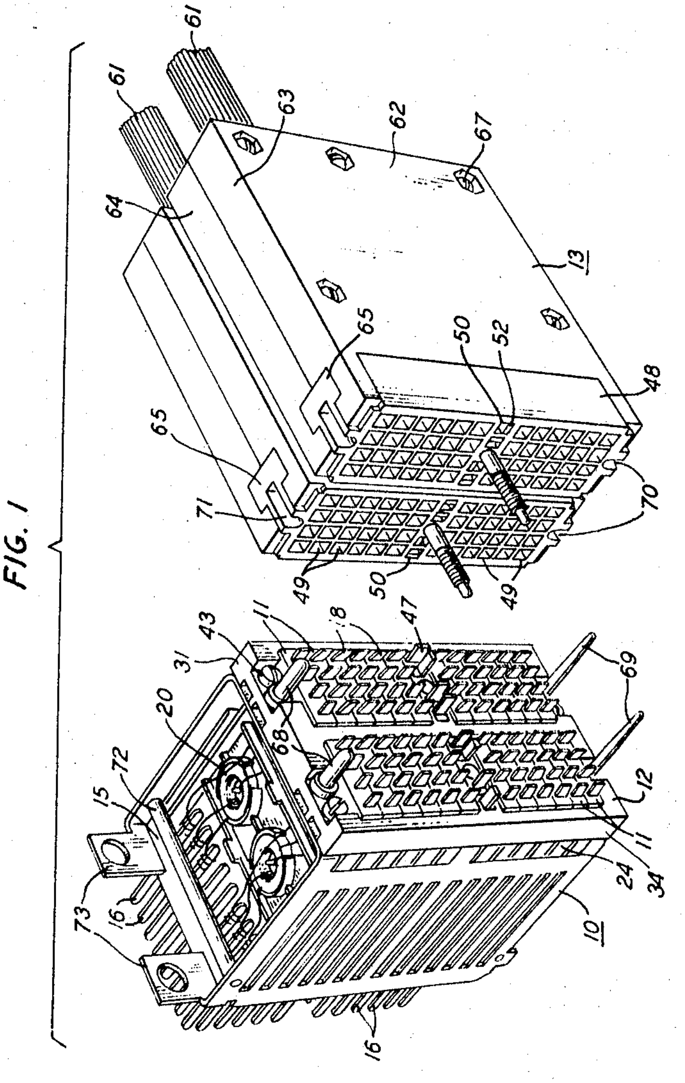
FIG. 1 is a front perspective view of the overall assembly including the novel component mounting scheme and the mating female plugs.
Figure 2:
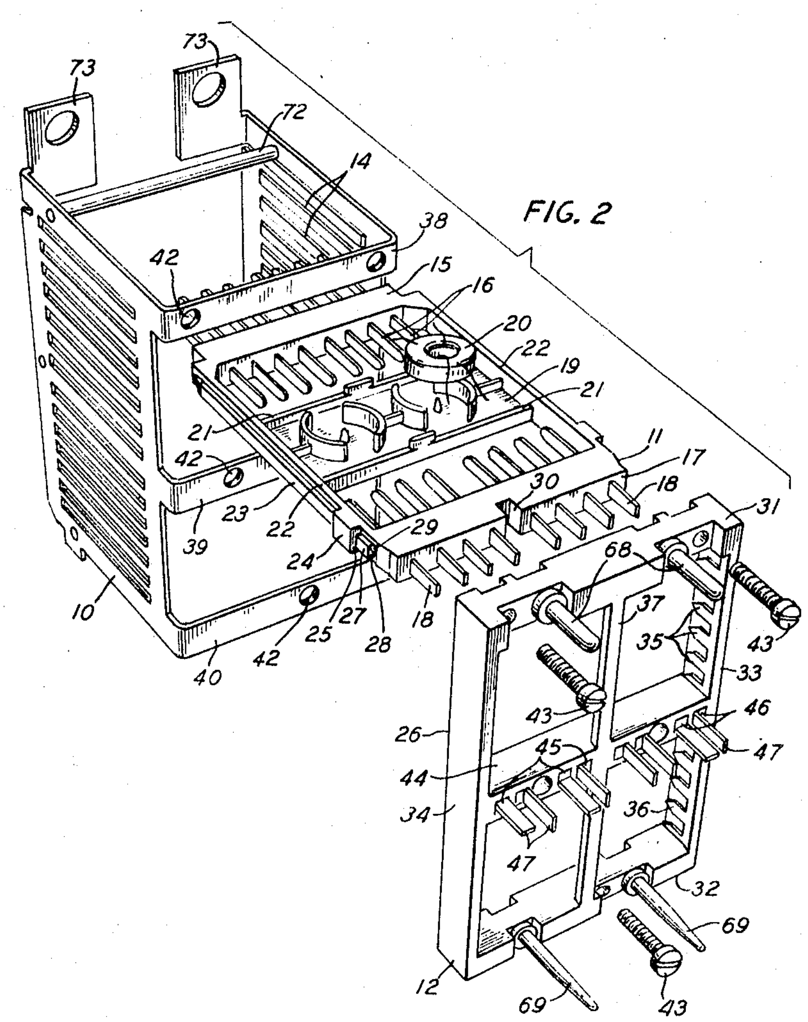
FIG. 2 is an exploded front perspective showing the component mounting assembly.

As seen in FIGS. 1 and 2, the overall assembly of a design embodying the inventive concepts comprises a frame 10, a plurality of trays 11, a faceplate 12, and one or more female connectors 13. The trays 11 mount in parallel guides 14 within the frame 10. Each tray 11 includes a rear end 15 which supports a first array of terminals 16 adapted to receive a solderless wrapped connection, and a front end 17 with an array of terminals 18 to be received in female connectors 13.

As seen in FIG. 2, each tray 11 also includes a central portion 19 within which to mount the desired electric components such as cores 20. Central portion 19 may advantageously include coffered ends 21 which form a mold for an encapsulating material such as epoxy. Each tray 11 also includes a pair of sides 22 and each side comprises a longitudinal ridge 23. These ridges 23 engage the guides 14 in mounting frame 10. Toward the front portion of each tray and extending from each of the sides 22 is an extension 24 which includes a reference surface 25. When installed in the frame 10, each tray 11 abuts the two vertical rear edges 26 of the faceplate 12 with their respective reference surfaces 25.

Along the respective sides of each tray 11 and forward of extensions 24, is a vertical alignment ridge 27 which is essentially a continuation of the ridge 23. Each ridge is beveled inwardly as shown at 28, and also beveled in arrowhead fashion as seen at 29 in FIG. 2. In addition, the front of each tray comprises a center alignment slot 30. When an array of trays are installed in a frame, these alignment slots line up in a vertical column in a manner to be described. Additionally, reference surfaces 25 on the forward side of extensions 24 also line up in a row. The slots in each tray are spaced preferably centrally.

As seen in FIG. 2, faceplate 12 includes a top end 31, a bottom end 32 and two sides 33, 34. Each of the sides 33, 34 include an array of spaced alignment ribs 35. When the faceplate 12 is installed on frame 10, the vertical alignment ridges 27 of each respective tray engage between the alignment ribs 35 of the faceplate. When so engaged, the clearance afforded a given tray alignment rib in a vertical direction is advantageously .009 inch maximum; and accordingly the vertical tray spacing accuracy is assured to this degree or to whatever degree required for mating with connector 13. The alignment ribs of the faceplate are also each beveled as at 36 in arrowhead fashion to facilitate engagement with the trays.

In the center of faceplate 12, and running vertically, an alignment bar 37 is provided having a width just slightly less than the width of the alignment slots 30 in each tray. When a faceplate is installed onto a frame containing a plurality of trays, the alignment bar is automatically placed in engagement with all of the tray slots. The horizontal alignment of each of the trays 11 thereby is assured.

As shown in FIG. 2, frame 10 includes at its front end a top arm 38, a middle arm 39, and a bottom arm 40. These arms may be made integrally with the frame proper by a suitable stamping process. Threaded portions at 42 engaging with screws 43 provide for securing the faceplate 12 to the frame 10. When so fastened in accordance with one facet of the invention, all trays are in a desired vertical and horizontal alignment and additionally all terminals protrude a desired degree from their respective trays. The result is a precisely aligned large array of terminals.

As illustrated in FIG. 2, the center truss 44 of faceplate 12 includes a plurality of spaced slots 45. These slots are square in the instant illustration but of course may be triangular, hexagonal, or some other shape. Into each of these slots fit inserts such as 46. When the slots are square as illustrated, inserts 46 will also be of square cross section. Each insert 46 comprises an offset leg 47 at the exposed end which essentially is a continuation of one of the sides of the insert. One of several acceptable means are provided to install the inserts 46 from the rear and to prevent protrusion of its leg 47 beyond a set amount. Each insert, accordingly, can fit in the instant illustration in any one of four rotational positions in a given slot 45. Advantageously, an insert is provided in each of the slots in the center truss 44. The rear end of each insert when installed is flush with the rear edge of the center truss. Thus, when faceplate 12 is in place, the rear edge of center truss 44 is flush against the middle arm 39 of the frame 10. Whatever configuration was given the several inserts is then locked in until the faceplate 12 is removed from the frame. The inserts 46 mate with corresponding inserts of a female connector, in a manner later to be described.

Some applications occur in which it is advantageous to provide connections to a first half of the installed terminal array, and other connections to the second half. A terminal array to the right of alignment bar may represent for example one such array; and the terminals to the left of alignment bar 37 may represent the second. In such case, the several inserts 46 to the left of the alignment bar 37 would serve one group of terminals and the several coding inserts to the right of the alignment bar 37 would serve the other.

Figures 3, 4, 4A, 5, 6, 7:
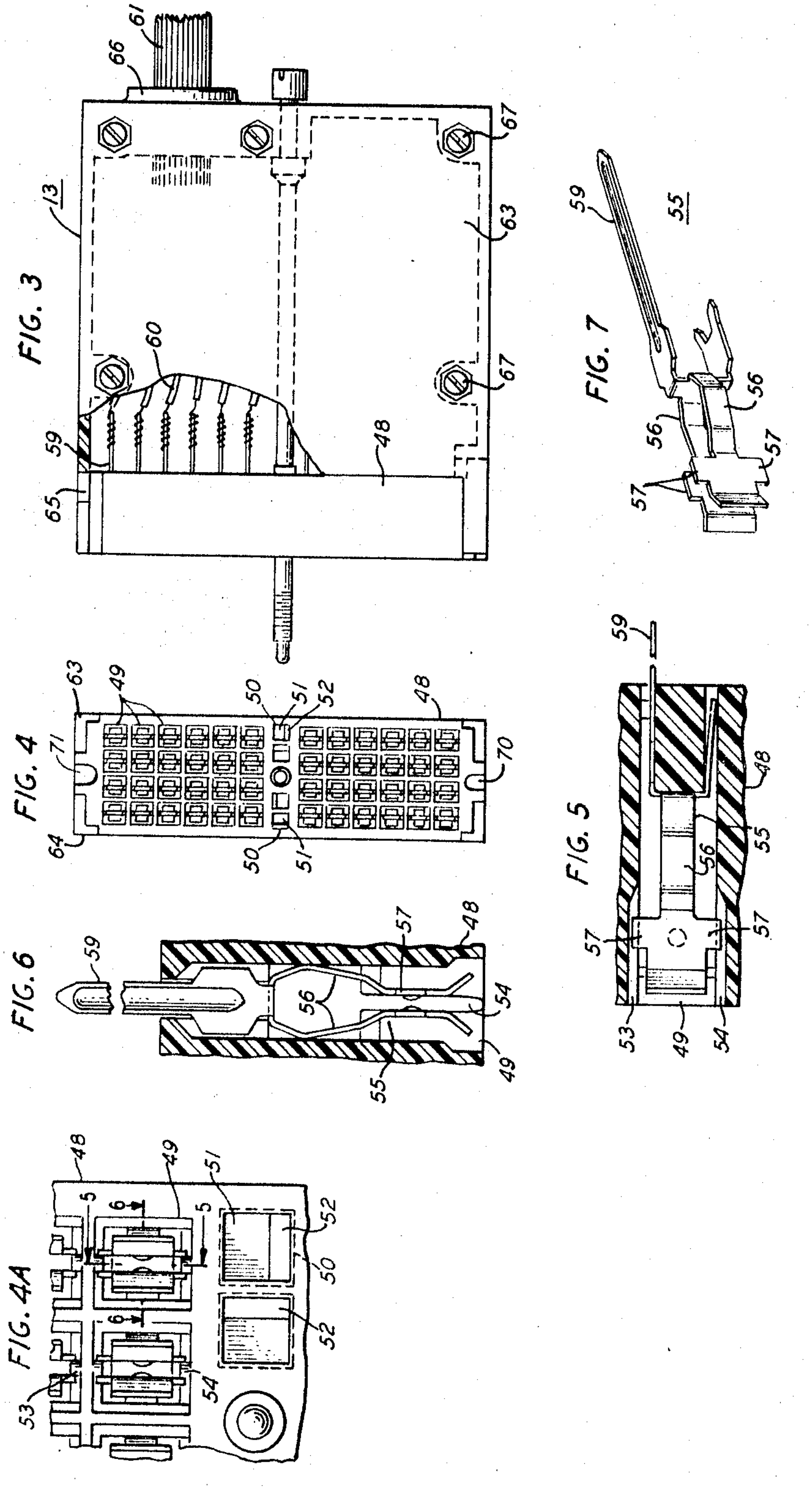
FIG. 3 is a partial, fragmented side view of a female plug.
FIG. 4 is a front view of a female plug.
FIG. 4A is an enlarged partial front view of said plug.
FIGS. 5–7 are top, side and perspective views of a contact structure used in the female plug.

FIGS. 3 and 4 show one female connector 13 adapted to service, for purposes of illustration, one half of the terminal array. Connector 13 comprises a block 48 with horizontal and vertical rows of slots 49 for mounting the female contact members. The spacing of these slots corresponds of course to the alignment of the male connector terminal arrays in the trays. Additionally, several slots 50 in a horizontal row in the center of block 48 are provided. These correspond in number to the slots occurring on one side of the center truss 44 of faceplate 12. Slots 50 accommodate inserts 51 which are similar to inserts 46. If the center truss slots 45 are square as illustrated, so also are the slots 50. In the embodiment illustrated, each insert 51 in the slots 50 also comprises an offset leg 52 which can be set in any one of four positions within its slot. Thus, in order for block 48 to fit onto its terminal array it is necessary that each of the inserts 46 in center truss 44 be aligned with respect to the corresponding inserts of block 48 so that no one of them will interfere. As an interference will occur if any one of the inserts involved is as much as 90° out of alignment, it is apparent that the block 48 will be accommodated onto faceplate 12 only when the coding insert ends of each member are in proper alignment. Obviously, if four coding pins are involved, each capable of assuming any one of four positions, then once a given female block is coded to fit onto a given faceplate it can be made practically impossible to effect a wrong connection even if many score of female connectors 13 are located in the same area.

As seen in FIGS. 4, 4A and 5, each of the slots 49 includes a top guide 53 and a bottom guide 54. Further, as seen in FIG. 7, each female connector prong 55 comprises a pair of opposed arms 56 which have wing pairs 57 that contact guides 53 and 54 since the arms 56 are adapted to be biased toward one another. In this fashion, a certain desired bias is pre-set into each of the contact arm pairs 56 thus helping to insure good electrical contact with the termials 18 of trays 11. As seen in FIGS. 5 and 6, prongs 55 also each has a pigtail 59 to which wrapped connection is made by a conductor such as 60 leading to cable 61. The latter is illustrated best in FIG. 3.

Advantageously, block 48 is mounted on a housing 62 comprising first and second sides 63, 64 such as shown in FIG. 1. The top and bottom portions of block 48 include a key 65 which fits into a mating portion of the two sides 63, 64 when assembled. The sides 63, 64 also include provision for receiving muticonductor electrical cable 61 through a rear entrance at 66. The sides 63, 64 are secured together by means such as screws 67.

Advantageously, each faceplate 12 also includes on either side of the vertical bar a relatively short prong 68 extending forward from the top portion and a relatively long prong 69 extending forward from the bottom portion. The long prong 69 is accommodated in a like size slot 70 occurring in the key portion of each block 48; and the shorter prong 68 is accommodated in a like size slot 71 occurring in the key portion of each block 48. This prong-and-slot arrangement facilitates the initial alignment of the female connectors 13 with respect to the faceplate 12 and hence in accordance with the invention, the terminals 18 of trays 11. Additionally, the diverse lengths of the two prongs assure against an inverted installation.

The rear portion of frame 10 includes a plurality of crossbars such as 72 which maintain the guide slots 14 in correct spacing. A pair of flanges such as 73 may be included as part of frame 10 to fasten the frame onto a suitable structure (not shown). The rear terminals 16 of each tray 11 extend beyond the frame and are adapted for a wrapped wire connection or the like. Their alignment normally is not critical. Of course, any one tray can be removed from the frame without having to disconnect the other trays, simply by removing faceplate 12 and the connections to that tray and sliding the tray out of the frame.

It is to be understood that the embodiments described herein are merely illustrative of the principles of the invention. Various modifications may be made thereto by persons skilled in the art without departing from the spirit and scope of the invention.

We claim:

1. An electrical connector mounting assembly comprising:

a frame comprising a forward end and a plurality of corresponding spaced parallel guides on either side;

a plurality of component trays each comprising a pair of side runners with forward edges, a front end with a vertical slot and a plurality of parallel terminals extending uniform distances from said front end; and a faceplate connected to said frame forward end comprising a pair of vertical side members, said members including a plurality of corresponding pairs of spaced horizontal slots in the inside wall of each member, each slot pair receiving the side runners of a tray; a vertical bar for receiving the tray slots to fix the trays in stacked vertical alignment; and a planar rear surface normal to said frame guides for contact with the forward edges of the tray side runners to fix the terminal ends in a planar array.

2. An assembly in accordance with claim 1 wherein said faceplate further comprises a plurality of slots, each slot including a coding key adjustable to any one of a plurality of discrete positions within said slot, each key including an outwardly-extending offset leg parallel to said terminals, said legs constituting in toto a unique spatial configuration for receiving a like mating spatial configuration of slots upon a female connector adapted for connection to said terminal end array, and for rejecting any non-mating slot configuration.

3. An assembly in accordance with claim 2 wherein the terminals of each tray comprise a first array on one side of said vertical bar and a second array on the other side of said bar, each said array having a portion of said coding keys associated therewith, thereby to receive two separate female connectors.

4. An assembly in accordance with claim 2 wherein each said faceplate key slot comprises a square hole and each coding key comprises a square insert and an offset leg on one side, said assembly further comprising means for maintaining said inserts in locked relation in their respective square hole.

References Cited

UNITED STATES PATENTS

| | | | |
|---|---|---|---|
| 3,218,518 | 11/1965 | Ashbridge et al. | 317—101 |
| 3,260,982 | 7/1966 | Bostwick | 174—68.5 |
| 3,368,115 | 2/1968 | Hoffman | 317—101 |

LEWIS H. MYERS, *Primary Examiner.*

J. R. SCOTT, *Assistant Examiner.*

U.S. Cl. X.R.

174—68.5; 317—101